(12) United States Patent
Posse et al.

(10) Patent No.: US 9,361,584 B2
(45) Date of Patent: *Jun. 7, 2016

(54) RECOMMENDER EVALUATION BASED ON TOKENIZED MESSAGES

(71) Applicant: LinkedIn Corporation, Mountain View, CA (US)

(72) Inventors: Christian Posse, Forster City, CA (US); Anmol Bhasin, Los Altos, CA (US); Wing Li, Sunnyvale, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/855,476

(22) Filed: Sep. 16, 2015

(65) Prior Publication Data

US 2016/0019461 A1  Jan. 21, 2016

Related U.S. Application Data

(63) Continuation of application No. 14/596,893, filed on Jan. 14, 2015, now Pat. No. 9,171,257, which is a continuation of application No. 13/687,413, filed on Nov. 28, 2012, now Pat. No. 8,959,044.

(51) Int. Cl.
*G06N 5/02* (2006.01)
*G06N 5/04* (2006.01)
*G06Q 30/02* (2012.01)
*G06F 17/27* (2006.01)

(52) U.S. Cl.
CPC .............. *G06N 5/04* (2013.01); *G06F 17/2785* (2013.01); *G06N 5/02* (2013.01); *G06Q 30/02* (2013.01)

(58) Field of Classification Search
CPC ....................................................... G06N 5/04
See application file for complete search history.

(56) References Cited

U.S. PATENT DOCUMENTS 8,630,960 B2   1/2014  Gross
8,799,773 B2   8/2014  Reis et al.
(Continued)

OTHER PUBLICATIONS

"U.S. Appl. No. 13/687,413, *Ex Parte Quayle* Action mailed Sep. 19, 2014", 5 pgs.
(Continued)

*Primary Examiner* — Alan Chen
(74) *Attorney, Agent, or Firm* — Schwegman Lundberg & Woessner, P.A.

(57) ABSTRACT

A machine may implement a recommender that provides recommendations to users. The machine may be configured to present a first version of the recommender configured by various parameters. A user may submit a message to the machine, and the machine may identify a parameter among the various parameters by tokenizing the message and identifying the parameter among the tokens. The machine may then generate a second version of the recommender by modifying the parameter and configuring the second version according to the modified parameter. The machine may then present the first and second versions of the recommender contemporaneously two different portions of the users. By tokenizing a further message received from the users, the machine may evaluate the first and second versions and determine whether the second version is a replacement of the first version.

20 Claims, 7 Drawing Sheets

(56) References Cited

U.S. PATENT DOCUMENTS

| | | |
|---|---|---|
| 8,959,044 B2 | 2/2015 | Posse et al. |
| 9,171,257 B2 | 10/2015 | Posse et al. |
| 2012/0095863 A1 | 4/2012 | Schiff et al. |
| 2012/0303559 A1 | 11/2012 | Dolan |
| 2013/0204833 A1 | 8/2013 | Pang et al. |
| 2013/0290339 A1 | 10/2013 | Luvogt et al. |
| 2014/0067370 A1 | 3/2014 | Brun |
| 2014/0149328 A1 | 5/2014 | Posse et al. |
| 2015/0127584 A1 | 5/2015 | Posse et al. |

OTHER PUBLICATIONS

"U.S. Appl. No. 13/687,413, Notice of Allowance mailed Oct. 7, 2014", 8 pgs.

"U.S. Appl. No. 14/596,893, Notice of Allowance mailed Jun. 30, 2015", 7 pgs.

"U.S. Appl. No. 14/596,893, Preliminary Amendment filed Jan. 15, 2015", 10 pgs.

"U.S. Appl. No. 14/596,893, Supplemental Notice of Allowability mailed Jul. 23, 2015", 4 pgs.

"U.S. Appl. No. 14/596,893, Supplemental Preliminary Amendment filed Feb. 6, 2015", 3 pgs.

RECOMMENDER EVALUATION BASED ON TOKENIZED MESSAGES

RELATED APPLICATIONS

This application is a continuation of U.S. patent application Ser. No. 14/596,893, filed Jan. 14, 2015, which is a continuation of U.S. patent application Ser. No. 13/687,413, filed Nov. 28, 2012 and issued on Feb. 17, 2015 as U.S. Pat. No. 8,959,044, which applications are incorporated herein by reference in their entirety.

TECHNICAL FIELD

The subject matter disclosed herein generally relates to the processing of data. Specifically, the present disclosure addresses systems and methods to facilitate evaluation of a recommender.

BACKGROUND

Various network-based services are used to provide recommendations to users and therefore may be called recommenders (e.g., recommendation services). A recommender may constitute all or part of a network-based service that is provided by a network-based system (e.g., one or more machines configured to provide some or all of the network-based service). Examples of network-based systems include commerce systems (e.g., shopping websites or auction websites), publication systems (e.g., classified advertisement websites), listing systems (e.g., wish list websites or gift registries), transaction systems (e.g., payment websites), and social network systems (e.g., LinkedIn®, Facebook®, or Twitter®). A recommendation may be provided by a recommender to a user of a recommendation service, and the recommendation may take the form of an explicit recommendation (e.g., a message or alert that recommends a product, a service, or a person) or an implicit recommendation (e.g., a search result that is sorted, ranked, or presented in a manner that highlights a recommended product, service, or person).

BRIEF DESCRIPTION OF THE DRAWINGS

Some embodiments are illustrated by way of example and not limitation in the figures of the accompanying drawings.

DETAILED DESCRIPTION

Figure 1:
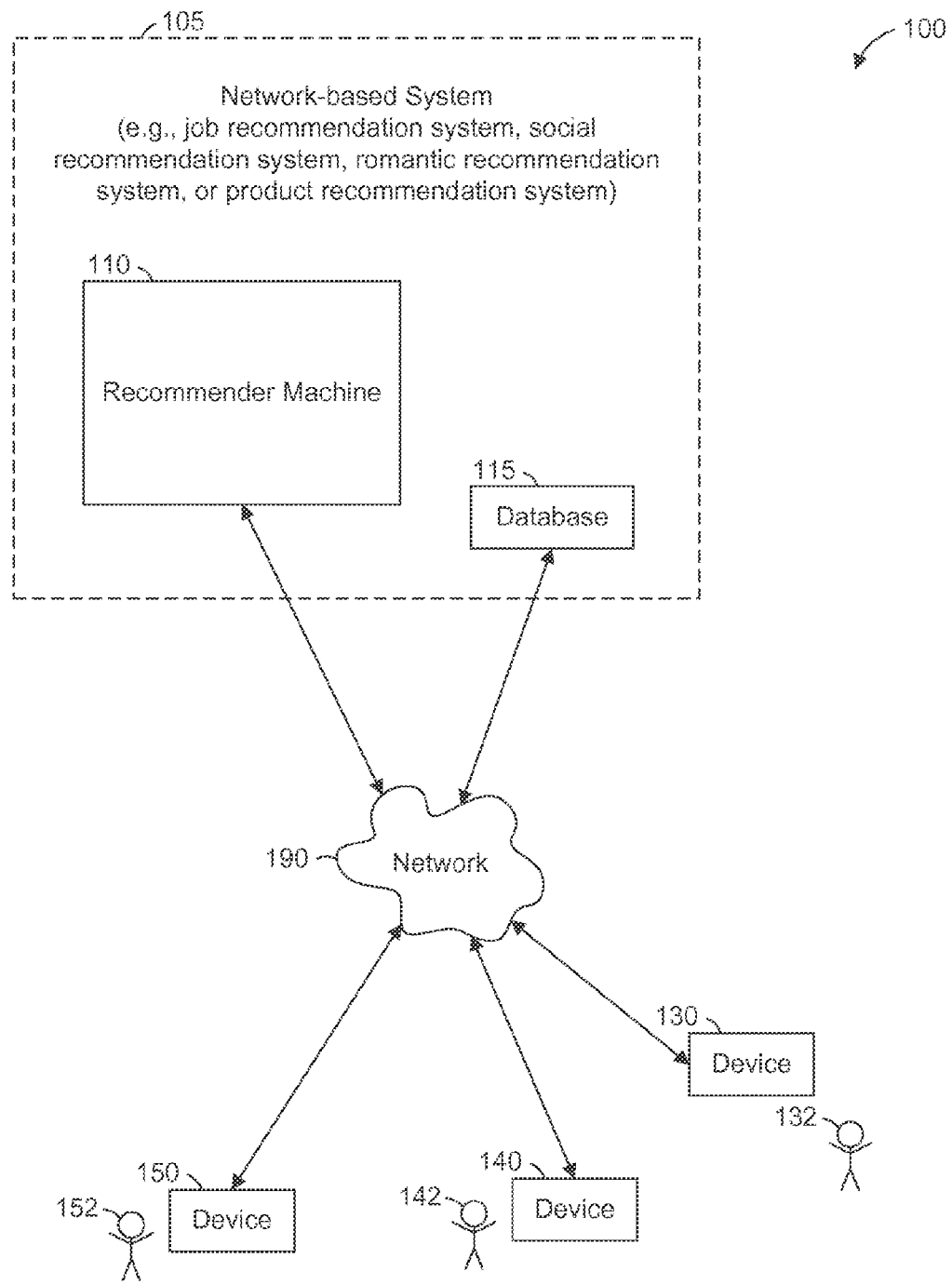
FIG. 1 is a network diagram illustrating a network environment suitable for evaluation of a recommender, according to some example embodiments.

Example methods and systems are directed to evaluation of the recommender. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A machine may be configured (e.g., by software modules) as a recommender machine that forms all or part of a network-based system and provides recommendations (e.g., recommendations of products, items, services, companies, people, or pets) to users of the network-based system. The machine may be configured to present a first version of a recommender based on various parameters that configure the first version. As used herein, a "recommender" is a system or subsystem (e.g., embodied in software, hardware, or any suitable combination thereof) that may be configured by one or more parameters to provide one or more recommendations to one or more users. The recommender machine may thus implement one or more versions of the recommender by presenting (e.g., executing, serving, or displaying) the one or more versions to various users, where each version of the recommender has its own configuration (e.g., its own values for the one or more parameters).

As used herein, a "parameter" that may configure a recommender, or a version thereof, is a factor (e.g., a user preference or a distance from a user's location, as stored in a user profile) in making a recommendation. A parameter may have a value that can be modified. For example, a parameter may be weighted by a scalar weight (e.g., 0.75 or 0.33) that determines a degree of influence accorded to the factor. As another example, a parameter may be set to a reference (e.g., pointer or link) to a data structure (e.g., among multiple data structures) that defines a probability distribution or model (e.g., among multiple probability distributions or models) usable to calculate a likelihood that a user would agree with a recommendation. In general, where an algorithm is used by a recommender to make recommendations, and that algorithm may be modified by modifying a factor (e.g., a variable or a constant) within the algorithm, modification of that factor may alter the configuration of the recommender and thereby change its resultant recommendations. Such a factor is a parameter of that recommender. Hence, a modification of a parameter (e.g., by modifying its value) that configures a recommender may distinguish one version of the recommender from another version of the recommender.

A user may communicate (e.g., submit or send) a message to the recommender machine, and the recommender machine may identify a parameter among the various parameters by tokenizing the message from the user and identifying the parameter among the tokens in the message. In some cases, identification of the parameter includes determining a sentiment of the message (e.g., positive feedback regarding the recommender, negative feedback regarding the recommender, or neutral feedback regarding the recommender). The recommender machine may then generate a second version of the recommender by modifying the parameter that was identified among the tokens from the user's message, and the modifying the parameter may be based on the sentiment of the message. The generated second version of the recommender may thus be configured according to the modified parameter.

The recommender machine may then present the first and second versions of the recommender contemporaneously to two different portions of the users. For example, the first version of the recommender may be presented to a first portion of the users, while the second version of the recommender may be presented to a second portion of the users. By tokenizing one or more further messages submitted by the users, the recommender machine may thus evaluate the first and second versions of the recommender and determine whether the second version, with the modified parameter, is a replacement of the first version. Accordingly, the recommender machine may automatically identify a configuration parameter for modification based on a message received from a user, present (e.g., deploy) modified and unmodified versions (e.g., configurations) of the recommender to the users, and based on a further message received, evaluate the modified version as a potential replacement of the unmodified version.

FIG. 1 is a network diagram illustrating a network environment 100 suitable for evaluation of a recommender, according to some example embodiments. The network environment 100 includes a recommender machine 110, a database 115, and devices 130, 140, and 150, all communicatively coupled to each other via a network 190. The recommender machine 110, the database 115, and the devices 130, 140, and 150 may each be implemented in a computer system, in whole or in part, as described below with respect to FIG. 7.

As shown, the recommender machine 110, with or without the database 115, may form all or part of a network-based system 105. According to various example embodiments, the network-based system 105 may be or include a recommendation system. For example, the network-based system 105 may form all or part of a job recommendation system (e.g., a system that recommends jobs to actual or potential jobseekers), a social recommendation system (e.g., a system that recommends friends to users of the system), a romantic recommendation system (e.g., an online dating system), a product recommendation system (e.g., a system that merchandises products or provides electronic marketplace), or any suitable combination thereof.

Also shown in FIG. 1 are users 132, 142, and 152. One or more of the users 132, 142, and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 132. Similarly, the user 142 is not part of the network environment 100, but is associated with the device 140 and may be a user of the device 140. For example, the device 140 may be a desktop computer, a vehicle computer, a tablet computer, a navigational device, a portable media device, or a smart phone belonging to the user 142. Likewise, the user 152 is not part of the network environment 100, but is associated with the device 150. As an example, the device 150 may be a desktop computer, a vehicle computer, a tablet computer, a navigational device, a portable media device, or a smart phone belonging to the user 152.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 7. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the recommender machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
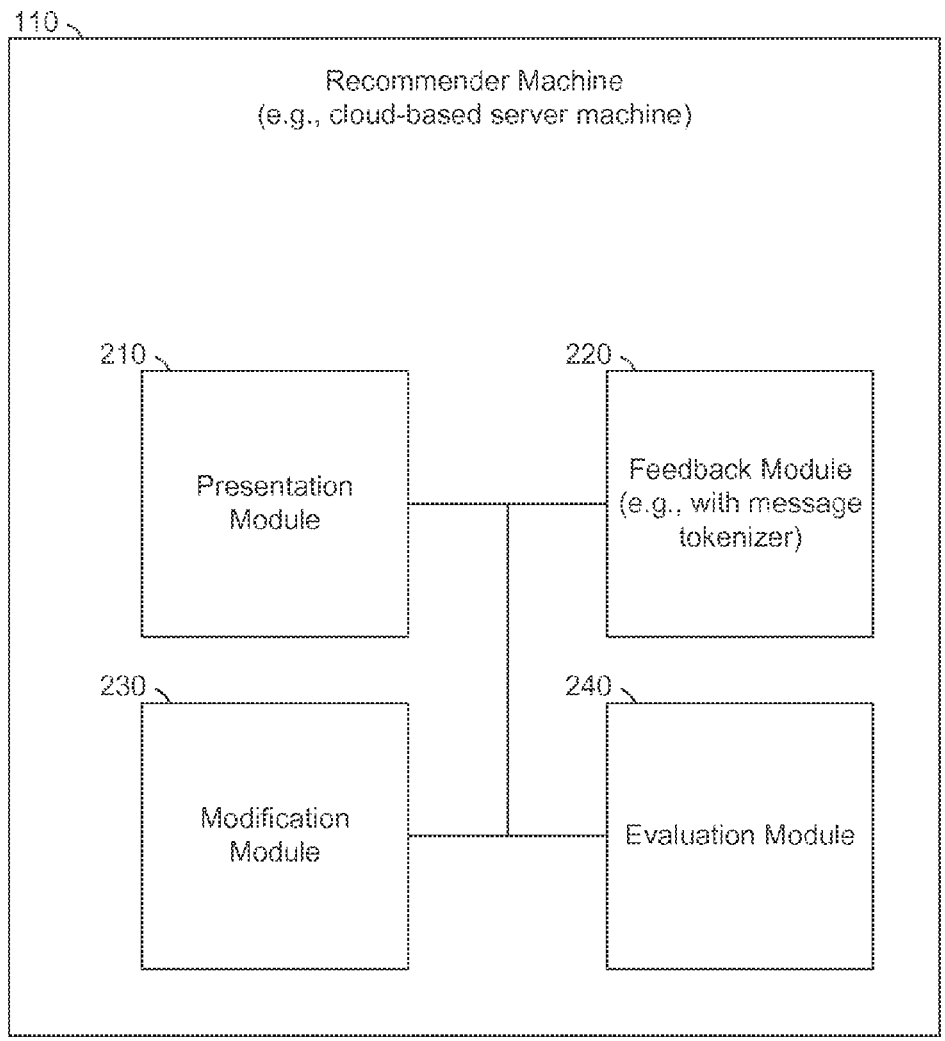
FIG. 2 is a block diagram illustrating components of a recommender machine configured to evaluate a recommender, according to some example embodiments.

FIG. 2 is a block diagram illustrating components of a recommender machine 110, as configured to evaluate a recommender, according to some example embodiments. The recommender machine 110 is shown as including a presentation module 210, a feedback module 220, a modification module 230, and an evaluation module 240, all configured to communicate with each other (e.g., via a bus, shared memory, or a switch). The feedback module 220 may include a message tokenizer (e.g., as a feature, subcomponent, subroutine, or portion of the feedback module 220).

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
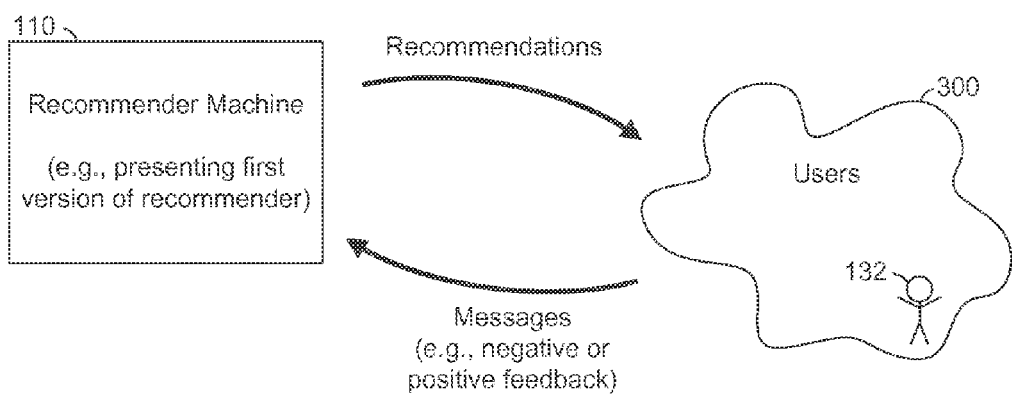
FIG. 3 is a conceptual diagram illustrating the recommender machine presenting a first version of the recommender to users and messages from the users being received by the recommender machine, according to some example embodiments.

FIG. 3 is a conceptual diagram illustrating the recommender machine 110, according to some example embodiments, presenting a first version of the recommender to users 300 (e.g., a group of users) of the network-based system 105. According to various example embodiments, the first version of the recommender may be an initial version, original version, default version, production version, deployed version, or any suitable combination thereof.

FIG. 3 also illustrates recommendations being provided by the recommender machine 110 to the users 300 and messages from the users 300 being received by the recommender machine 110, according to some example embodiments. As shown, the user 132 is one of the users 300. Although not shown, the users 142 and 152 may be included among the users 300. As illustrated in FIG. 3, the recommender machine 110 may present the first version of the recommender to the users 300, provide the resulting recommendations to the users 300, and receive messages (e.g., positive, negative, or neutral feedback) regarding the recommendations generated by the first version of the recommender.

Figure 4:
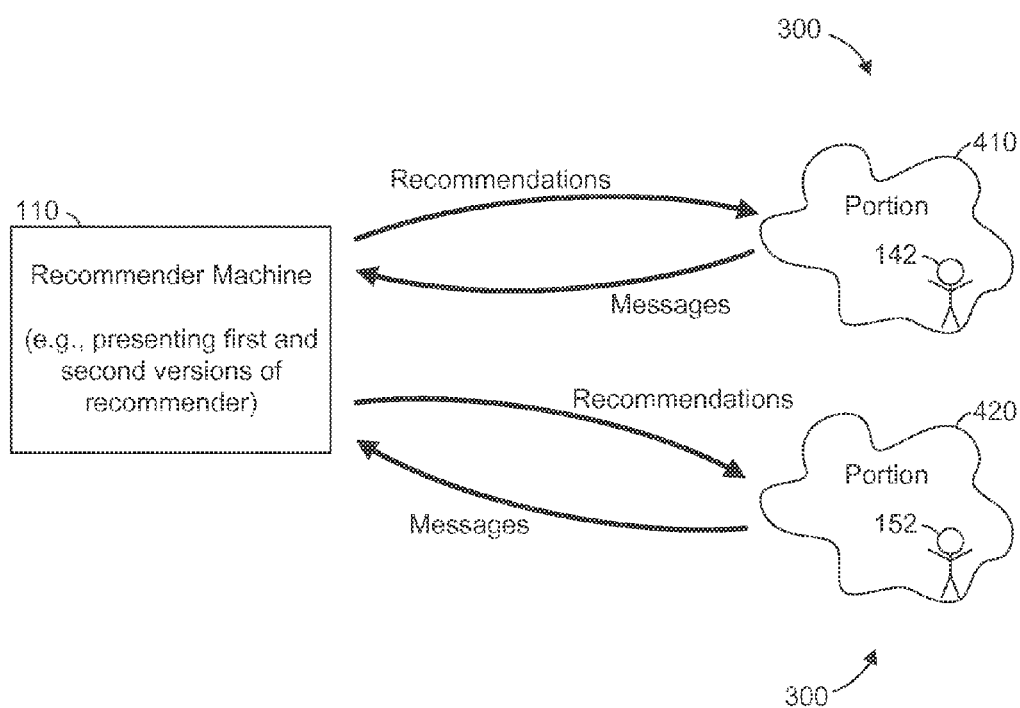
FIG. 4 is a conceptual diagram illustrating the recommender machine providing the first version of the recommender to a first portion of the users while providing a second version of the recommender to a second portion of the users, according to some example embodiments.

FIG. 4 is a conceptual diagram illustrating the recommender machine 110, according to some example embodiments, providing the first version of the recommender to a portion 410 (e.g., a first portion) of the users 300. The recommender machine 110 is also shown as contemporaneously (e.g., simultaneously, in parallel, on the same day, in the same month, or any suitable combination thereof) providing a second version of the recommender to a second portion 420 (e.g., a second portion) of the users 300, according to some example embodiments. According to various example embodiments, the second version of the recommender may be an experimental version, a test version (e.g., alpha test version or beta test version), a revised version, a modified version, a pre-production version, a pre-deployment version, or any suitable combination thereof.

FIG. 4 also illustrates recommendations being provided by the recommender machine 110 to the portion 410 of the users 300. The recommendations provided to the portion 410 of the users 300 may be generated based on the first version of the recommender. FIG. 4 additionally illustrates recommendations being provided by the recommender machine 110 to the portion 420 of the users 300. The recommendations provided to the portion 420 of the users 300 may be generated based on the second version of the recommender. As shown, the user 142 is included in the portion 410 of users 300, and the user 152 is included in the portion 420 of the users 300. As illustrated in FIG. 4, the recommender machine 110 may present the first version of the recommender to the portion 410, provide the resulting recommendations to the portion 410, and receive messages (e.g., positive, negative, or neutral feedback) regarding the recommendations generated by the first version of the recommender from the portion 410. Contemporaneously, the recommender machine 110 may present the second version of the recommender to the portion 420, provide the resulting recommendations to the portion 420, and receive messages regarding the recommendations generated by the second version of the recommender from the portion 420. This may have the effect of presenting different versions of the recommender to the different portions 410 and 420, and consequently receiving messages from the portions 410 and 420 regarding the different versions of the recommender.

As described in further detail below, the recommender machine 110 may tokenize the messages received from the portions 410 and 420. From these tokenized messages, the recommender machine 110 may determine sentiments of the messages and accordingly evaluate the first and second versions of the recommender. For example, the recommender machine 110 may compare a count of positive messages regarding the first version of the recommender to a count of positive messages regarding the second version of the recommender. As another example, the recommender machine 110 may compare a count of negative messages regarding the first version of the recommender to a count of negative messages regarding the second version of the recommender. In hybrid example embodiments, counts of positive and negative messages for the first version are compared to counts of positive and negative messages for the second version. Accordingly, the recommender machine 110 may determine whether the second version is a replacement (e.g., successor or improvement) of the first version.

Figure 5:
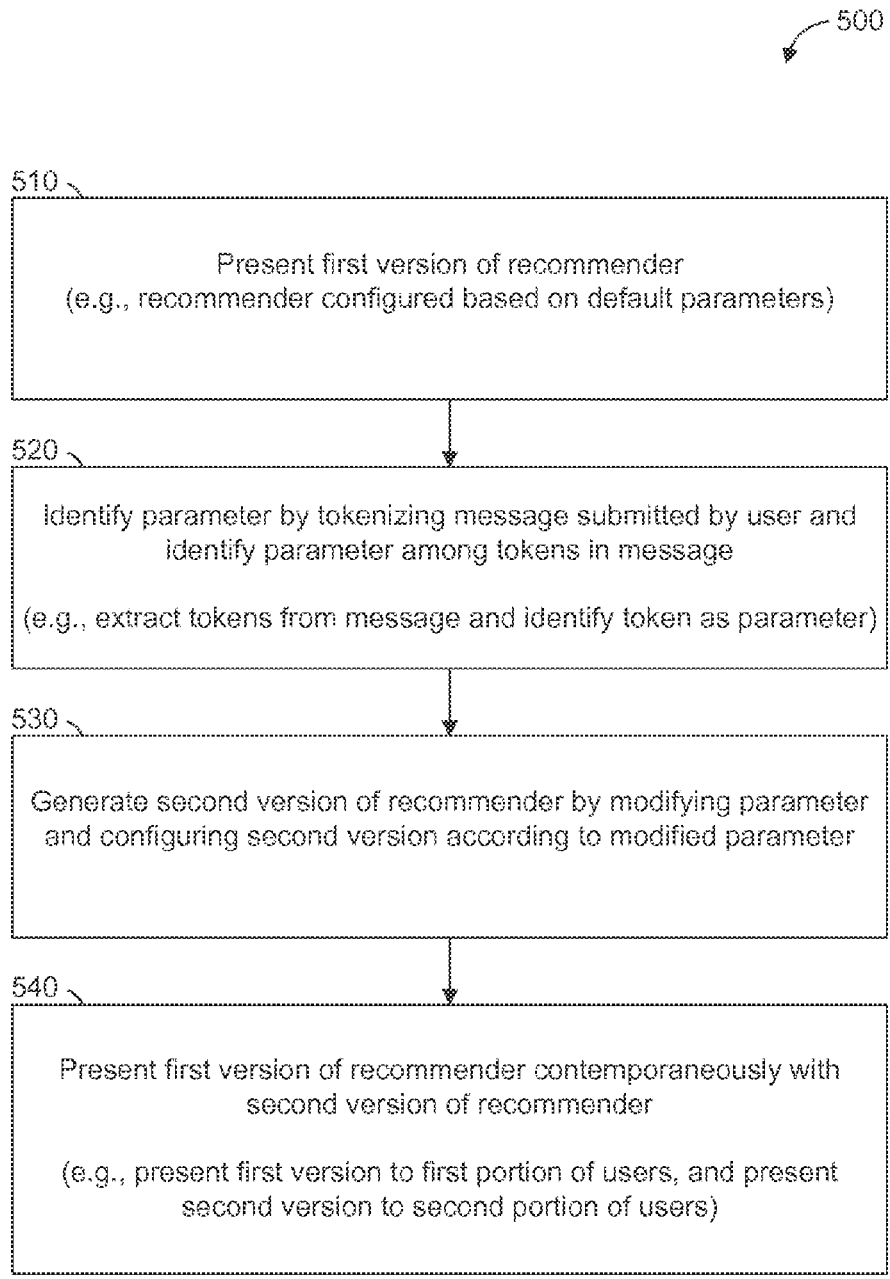
FIG. 5-6 are flowcharts illustrating operations of the recommender machine in performing a method of evaluating the recommender, according to some example embodiments.
Figure 6:
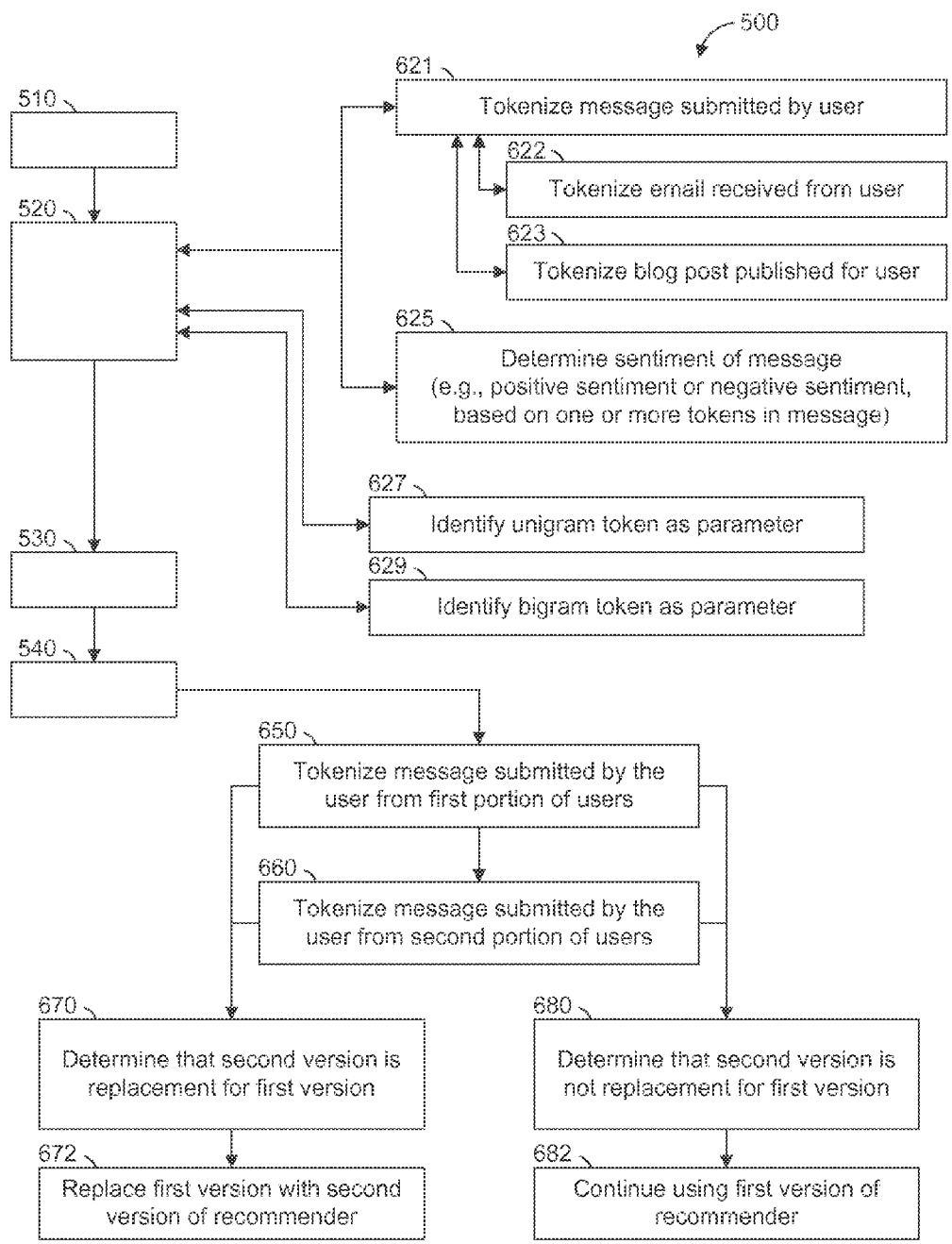

FIG. 5-6 are flowcharts illustrating operations of the recommender machine 110 in performing a method 500 of evaluating the recommender, according to some example embodiments. Operations in the method 500 may be performed by the recommender machine 110, using modules described above with respect to FIG. 2. As shown in FIG. 5, the method 500 includes operations 510, 520, 530, and 540.

In operation 510, the presentation module 210 presents a first version of the recommender. The presentation module 210 may present the first version to the users 300, and the first version may be configured to provide the users 300 with recommendations. Moreover, the first version may be configured based on (e.g., by) one or more parameters (e.g., a plurality or group of parameters) that are usable to configure the recommender. In some example embodiments, the first version of the recommender is an instance (e.g., implementation) of the recommender configured based on the default parameters.

In operation 520, the feedback module 220 identifies a parameter (e.g., among multiple parameters of the recommender). The feedback module 220 may perform operation 520 by tokenizing a message submitted by (e.g., received from) the user 132 (e.g., via the device 130). For example, the user 132 may submit the message electronically (e.g., as an email, text message, a blog post, or a feedback comment), where the message includes a body of text. In some example embodiments, the feedback module 220 receives the message and then tokenizes the message. The feedback module 220 may tokenize the message by analyzing the text and extracting tokens (e.g., text tokens or semantic tokens) from the message. A token among the extracted tokens may indicate (e.g., specify, define, or refer to) a parameter that configures the recommender, for example, by matching the parameter. Based on such a match, in operation 520, the feedback module 220 may identify the parameter. That is, the feedback module 220 may determine that the message mentioned or discussed the parameter of the recommender.

In some example embodiments, the recommender is configured to recommend jobs (e.g., employment opportunities) to the users 300. Accordingly, the recommendations provided by the recommender machine 110 in presenting one or more versions of the recommender may refer to jobs that are recommended to one or more of the users 300. In such example embodiments, the parameter identified in operation 520 may be a threshold distance (e.g., a minimum or maximum geographical distance, such as 10 miles) between a user (e.g., user 132) and a location (e.g., a company location or offset location) of a job recommended to a user. For example, the parameter may be a threshold distance according to which the recommender (e.g., the first or second version of the recommender) determines whether to provide a recommendation of a job to the user.

In certain example embodiments, the recommender is configured to recommend social contacts (e.g., friends or activity partners) to the users 300. Accordingly, the recommendations provided by the recommender machine 110 in presenting one or more versions of the recommender may refer to social contacts that are recommended to one or more of the users 300. In such example embodiments, the parameter identified in operation 520 may be a threshold age of a social contact recommended to a user (e.g., a minimum or maximum age of a person, such as 21 years, or a relative age, such as within five years older or younger than the user). For example, the parameter may be a threshold age according to which the recommender (e.g., the first or second version of the recommender) determines whether to provide a recommendation of a social contact to the user.

In various example embodiments, the recommender is configured to recommend romantic contacts (e.g., online dating partners) to the users 300. Accordingly, the recommendations provided by the recommender machine 110 in presenting one or more versions of the recommender may refer to romantic contacts that are recommended to one or more of the users 300. In such example embodiments, the parameter identified in operation 520 may be a threshold distance (e.g., a minimum or maximum geographical distance, such as 50 miles)

between a user (e.g., user 132) and a location (e.g., a city of residence) of a romantic contact recommended to a user. For example, the parameter may be a threshold distance according to which the recommender (e.g., the first or second version of the recommender) determines whether to provide a recommendation of a romantic contact to the user.

In some example embodiments, the recommender is configured to recommend products (e.g., goods, services, digital media, or any suitable combination thereof) to the users 300. Accordingly, the recommendations provided by the recommender machine 110 in presenting one or more versions of the recommender may refer to products that are recommended to one or more of the users 300. In such example embodiments, the parameter identified in operation 520 may be a threshold price (e.g., a minimum or maximum monetary cost, such as $100) for a product recommended to a user. For example, the parameter may be a threshold price according to which the recommender (e.g., the first or second version of the recommender) determines whether to provide a recommendation of a product to the user.

In operation 530, the modification module 230 generates a second version of the recommender. The second version of the recommender is configured differently than the first version of the recommender (e.g., presented in operation 510). The modification module 230 may generate a second version by modifying the parameter identified in operation 520 and configuring the second version according to the modified parameter.

In operation 540, the evaluation module 240 presents the first version of the recommender contemporaneously with the second version of the recommender. In particular, the first version may be presented to the portion 410 of the users 300, while the second version may be presented contemporaneously to the portion 420 of the users 300.

As shown in FIG. 6, the method 500 may include one or more of operations 621, 622, 623, 625, 627, 629, 650, 660, 670, 672, 680, and 682. One or more of operations 621 and 625 may be performed as part (e.g., a precursor task, a subroutine, or a portion) of operation 520, in which the feedback module 220 identifies the parameter (e.g., among multiple parameters modifiable to configure the recommender), as discussed above with respect to FIG. 5.

In operation 621, the feedback module 220 tokenizes a message submitted by (e.g., received from) the user 132 (e.g., via the device 130). As noted above, the feedback module 220 may include a message tokenizer (e.g., as a feature, subcomponent, subroutine, or portion of the feedback module 220), and the feedback module 220 may tokenize the message by analyzing the text and extracting one or more tokens (e.g., text tokens or semantic tokens) from the message. Accordingly, the feedback module 220 may perform operation 520 by tokenizing a message in operation 621.

One or more of operations 622 and 623 may be performed as part (e.g., a precursor task, a subroutine, or a portion) of operation 621 in which the feedback module 220 tokenizes the message. In example embodiments that include operation 622, the message is an email message (e.g., received from the user 132 via the device 130), and accordingly, in operation 622, the feedback module 220 tokenizes the email. In example embodiments that include operation 623, the message is a blog post (e.g., a micro-blog post, such as a "tweet" published by Twitter®) published on behalf of the user 132 (e.g., as submitted by the device 130), and accordingly, in operation 623, the feedback module 220 accesses the blog post and tokenizes the blog post.

In operation 625, the feedback module 220 determines (e.g., detects or infers) a sentiment of the message. Determination of the sentiment of the message may be performed based on one or more tokens extracted in operation 621. The sentiment of the message may be determined as being positive (e.g., positive feedback regarding the recommender), negative (e.g., negative feedback regarding the recommender), or neutral (e.g., neutral feedback regarding the recommender). In some example embodiments, multiple sentiments may be determined to exist within the message.

In example embodiments that include operation 625, the modifying of the parameter in operation 530 may be performed based on the sentiment determined in operation 625. For example, the feedback module 220, in performing operation 625, may determine that the sentiment of the message is positive, and the modification module 230, in performing operation 530, may modify the parameter based on the sentiment being positive. In particular, the value of the parameter may be adjusted in a manner that configures the recommender (e.g., the second version of the recommender) to be more strongly influenced by the parameter, thus increasing the effect of the parameter on the recommendations provided. As another example, the feedback module 220 may determine that the sentiment of the message is negative, and the modification module 230 may modify the parameter based on the sentiment being negative. In particular, the value of the parameter may be adjusted in a manner that configures the recommender (e.g., the second version of the recommender) to be less strongly influenced by the parameter, thus reducing its effect on the recommendations provided.

According to some example embodiments, operation 627 may be performed as part of operation 520, in which the feedback module 220 identifies the parameter, at least in part, by tokenizing the message. In operation 627, the feedback module 220 identifies a unigram token among the tokens within the message as the parameter. In example embodiments that include operation 627, a unigram token among the extracted tokens may indicate (e.g., specify, define, or refer to) a parameter that configures the recommender, for example, by matching the parameter. Based on such a match, in operation 520, the feedback module 220 may identify the unigram token as the parameter. That is, the feedback module 220 may determine that the message mentioned or discussed the parameter of the recommender, based on the unigram token matching the parameter. In some example embodiments, the unigram token is the parameter, while in other example embodiments, the feedback module 220 identifies a concept (e.g., sentiment) from the unigram token as the parameter. For example, a positive sentiment within the message may be identified from the unigram token "good," and a negative sentiment within the message may be identified from the unigram token "bad."

According to certain example embodiments, operation 629 may be performed as part of operation 520. In operation 629, the feedback module 220 identifies a bigram token among the tokens within the message as the parameter. In example embodiments that include operation 629, a bigram token among the extracted tokens may indicate (e.g., specify, define, or refer to) a parameter that configures the recommender, for example, by matching the parameter. Based on such a match, in operation 520 feedback module 220 may identify the bigram token as the parameter. That is, the feedback module 220 may determine that the message mentioned or discussed the parameter of the recommender, based on the bigram token matching the parameter. In certain example embodiments, the bigram token is the parameter, while in other example embodiments, the feedback module 220 identifies a concept (e.g., sentiment) from the bigram token as the parameter. For example, a positive sentiment within the message may be identified from the bigram token "solid fit," while a negative sentiment within the message may be identified from the bigram token "too far."

As shown in FIG. 6, one or more of operations 650, 660, 670, 672, 680, and 682 may be performed after operation 540, in which the evaluation module 240 respectively presents the first and second versions of the recommender to the portion 410 and portion 420 of the users 300. In operation 650, the feedback module 220 tokenizes a message (e.g., a second message or a further message) submitted by (e.g., received from) the user 142, who is part of the portion 410 and is presented with the first version of the recommender (e.g., received recommendations generated by the first version of the recommender). In some example embodiments, the feedback module 220 receives the message and then tokenizes the message (e.g., in a manner similar to that described above with respect to operation 520). The tokenizing of the message may also include determining the sentiment of the message, similar to that described above with respect to operation 625. Moreover, the tokenizing of the message may include tokenizing an email received from the user 142 or tokenizing a blog post published for the user 142.

Furthermore, one or more of the tokens extracted from the message may indicate (e.g., specify, define, or refer to) the parameter that was modified to configure the second version of the recommender in operation 530, for example, by matching the parameter. Based on such a match, the feedback module 220 may determine that the message mentioned or discussed this parameter of the recommender. Since the feedback module 220 may determine the sentiment of the message (e.g., in operation 650), the evaluation module 240 may determine (e.g., detect or infer) that the user 142 is providing positive feedback, negative feedback, or neutral feedback, regarding the first version of the recommender (e.g., as presented to the user 142 in operation 540).

In operation 660, the feedback module 220 tokenizes a message (e.g., a third message or a further message) submitted by (e.g., received from) the user 152, who is part of the portion 420 and is presented with the second version of the recommender (e.g., received recommendations generated by the second version of the recommender). In some example embodiments, the feedback module 220 receives the message and then tokenizes the message (e.g., in a manner similar to that described above with respect to operation 520). The tokenizing of the message may also include determining the sentiment of the message, similar to that described above with respect to operation 625. Moreover, the tokenizing of the message may include tokenizing an email received from the user 152 or tokenizing a blog post published for the user 152.

Furthermore, one or more of the tokens extracted from the message may indicate (e.g., specify, define, or refer to) the parameter that was modified to configure the second version of the recommender in operation 530, for example, by matching the parameter. Based on such a match, the feedback module 220 may determine that the message mentioned or discussed this parameter of the recommender. Since the feedback module 220 may determine the sentiment of the message (e.g., in operation 660), the evaluation module 240 may determine (e.g., detect or infer) that the user 152 is providing positive feedback, negative feedback, or neutral feedback, regarding the second version of the recommender (e.g., as presented to the user 152 in operation 540).

In operation 670, the evaluation module 240 determines that the second version of the recommender (e.g., as presented to the user 152) is a replacement of the first version of the recommender (e.g., as presented to the user 142). This determination may be made based on the parameter being among the tokens (e.g., matching one or more of the tokens) extracted from one or more messages received (e.g., tokenized in operation 650, operation 660, or both) regarding the presentation of the first or second versions of the recommender. For example, the evaluation module 240 may determine that the second version is an upgrade, update, improvement, or other successor to the first version of the recommender (e.g., generates fewer complaints or more praises from one or more of the users 300). In some example embodiments, the evaluation module 240 may schedule a time at which the recommender machine 110 (e.g., via the presentation module 210) will cease presenting the first version of the recommender and present the second version of the recommender (e.g., exclusively) to the users 300. This may have the effect of scheduling a cancellation of the first version of the recommender and a replacement the first version of the recommender with the second version of the recommender.

In operation 672, the evaluation module 240 replaces the first version of the recommender with the second version of the recommender. For example, the evaluation module 240 (e.g., according to a schedule determined in operation 670) may cease presenting the first version and present the second version (e.g., exclusively) to the users 300. In certain example embodiments, the evaluation module 240 initiates the replacement of the first version with the second version, and the actual replacement of the first version with the second version is managed by service management software executing elsewhere in the network-based system 105.

In operation 680, the evaluation module 240 determines that the second version of the recommender (e.g., as presented to the user 152) is not a replacement of the first version of the recommender (e.g., as presented to the user 142). This determination may be made based on the parameter being among the tokens (e.g., matching one or more of the tokens) extracted from one or more messages received (e.g., tokenized in operation 650, operation 660, or both) regarding the presentation of the first or second versions of the recommender. For example, the evaluation module 240 may determine that the second version performs no better than (e.g., worse than) the first version of the recommender (e.g., generates more complaints or fewer praises from one or more of the users 300). In some example embodiments, the evaluation module 240 may schedule a time at which the recommender machine 110 (e.g., via the presentation module 210) will cease presenting the second version of the recommender and present the first version of the recommender (e.g., exclusively) to the users 300. This may have the effect of scheduling a cancellation of the second version of the recommender and continuing a presentation of the first version of the recommender.

In operation 682, the evaluation module 240 ceases presentation of the second version of the recommender and continues presenting the first version of the recommender. For example, the evaluation module 240 (e.g., according to a schedule determined in operation 680) may cease presenting the second version and present the first version (e.g., exclusively) to the users 300. In certain example embodiments, the evaluation module 240 initiates a cancellation of the second version, and the actual cancellation of the second version is managed by service management software executing elsewhere in the network-based system 105.

According to various example embodiments, one or more of the methodologies described herein may facilitate evaluation of a recommender. Moreover, one or more of the methodologies described herein may facilitate generation of multiple versions (e.g., configurations) of the recommender and evaluation (e.g., by comparison) of the generated versions. Hence, one or more of the methodologies described herein may facilitate automated modification of an algorithm implemented by the recommender, automated testing of modified and unmodified versions of the algorithm with subsets of a user base for the recommender, and automated selection of an improved version of the algorithm.

When these effects are considered in aggregate, one or more of the methodologies described herein may obviate a need for certain efforts or resources that otherwise would be involved in evaluation of the recommender. Efforts expended by an administrator of the recommender in testing various versions of the recommender, as well as efforts expended by a user in providing feedback regarding a recommender, may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 7:
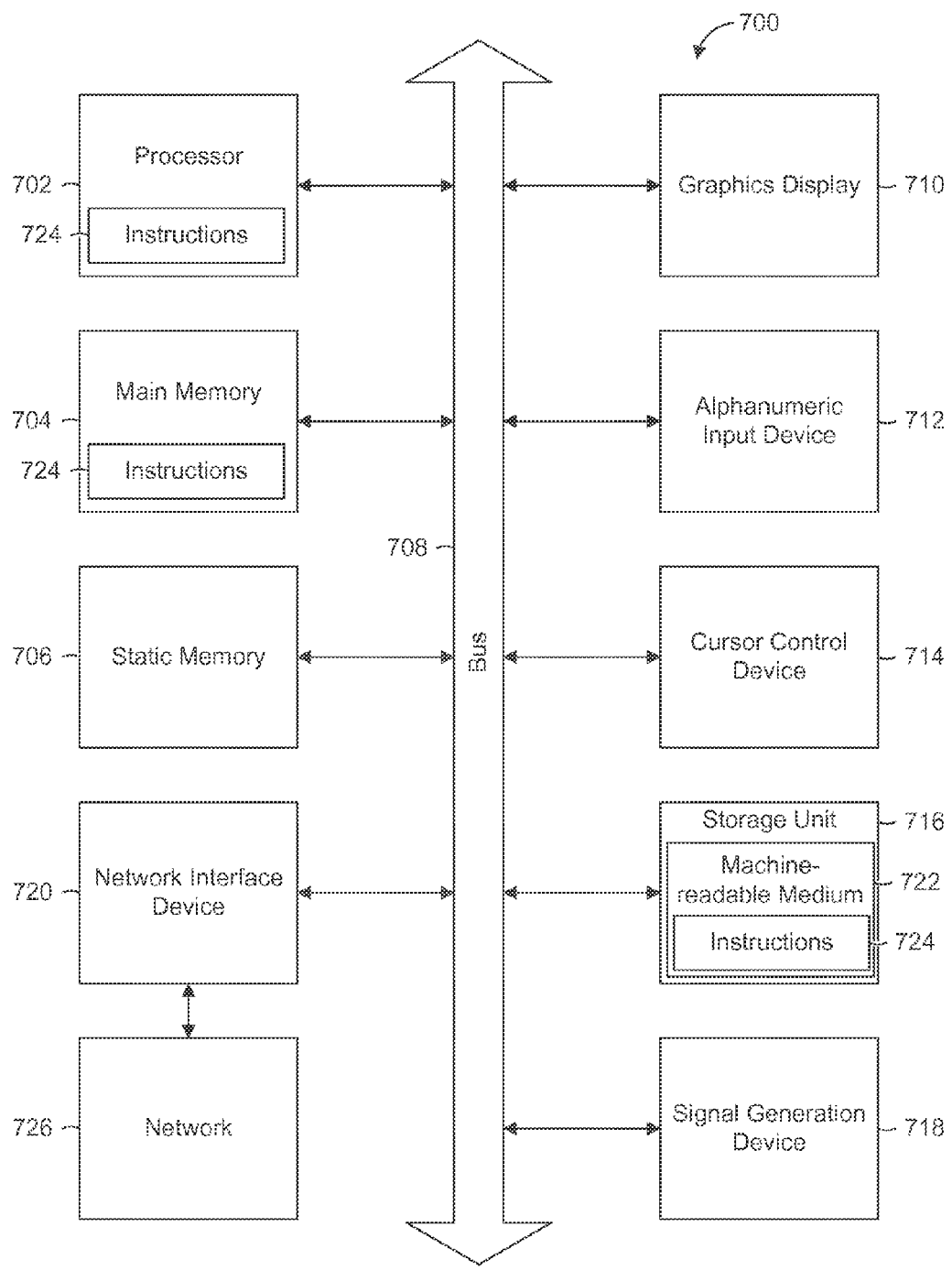
FIG. 7 is a block diagram illustrating components of a machine, according to some example embodiments, able to read instructions from a machine-readable medium and perform any one or more of the methodologies discussed herein.

FIG. 7 is a block diagram illustrating components of a machine 700, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 7 shows a diagrammatic representation of the machine 700 in the example form of a computer system and within which instructions 724 (e.g., software, a program, an application, an applet, an app, or other executable code) for causing the machine 700 to perform any one or more of the methodologies discussed herein may be executed, in whole or in part. In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a distributed (e.g., peer-to-peer) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include a collection of machines that individually or jointly execute the instructions 724 to perform all or part of any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The machine 700 may further include a graphics display 710 (e.g., a plasma display panel (PDP), a light emitting diode (LED) display, a liquid crystal display (LCD), a projector, or a cathode ray tube (CRT)). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which is stored the instructions 724 embodying any one or more of the methodologies or functions described herein. The instructions 724 may also reside, completely or at least partially, within the main memory 704, within the processor 702 (e.g., within the processor's cache memory), or both, during execution thereof by the machine 700. Accordingly, the main memory 704 and the processor 702 may be considered as machine-readable media. The instructions 724 may be transmitted or received over a network 726 (e.g., network 190) via the network interface device 720.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 700), such that the instructions, when executed by one or more processors of the machine (e.g., processor 702), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions define various example embodiments of methods, machine-readable media, and systems (e.g., apparatus) discussed herein:

1. A method comprising:
   presenting a first version of a recommender configured to provide users with recommendations based on a plurality of parameters that configure the first version of the recommender;
   identifying a parameter among the plurality of parameters by tokenizing a message submitted by a user among the users and identifying the parameter among tokens within the tokenized message;

generating a second version of the recommender by modifying the parameter identified among the tokens and configuring the second version according to the modified parameter, the generating of the second version of the recommender being performed by a processor of a machine; and presenting the first version of the recommender contemporaneously with the second version of the recommender, the first version being presented to a first portion of the users, the second version being presented to a second portion of the users.

2. The method of description 1 further comprising:
tokenizing a further message submitted by a further user among the first portion of the users; and
determining that the second version of the recommender is a replacement of the first version of the recommender based on the parameter being among tokens of the tokenized further message.

3. The method of description 1 further comprising:
tokenizing a further message submitted by a further user among the first portion of the users; and
determining that the second version of the recommender is not a replacement of the first version of the recommender based on the parameter being among tokens of the tokenized further message.

4. The method of description 1 further comprising:
tokenizing a further message submitted by a further user among the second portion of the users; and
determining that the second version of the recommender is a replacement of the first version of the recommender based on the parameter being among tokens of the tokenized further message.

5. The method of description 1 further comprising:
tokenizing a further message submitted by a further user among the second portion of the users; and
determining that the second version of the recommender is not a replacement of the first version of the recommender based on the parameter being among tokens of the tokenized further message.

6. The method of any of descriptions 1-5, wherein:
the identifying of the parameter among the tokens includes determining a sentiment of the message submitted by the user; and
the modifying of the parameter is based on the sentiment of the message.

7. The method of description 6, wherein:
the determining of the sentiment determines that the sentiment is positive; and
the modifying of the parameter is based on the sentiment being positive.

8. The method of description 6, wherein:
the determining of the sentiment determines that the sentiment is negative; and
the modifying of the parameters is based on the sentiment being negative.

9. The method of any of descriptions 1-8, wherein:
the recommendations refer to jobs recommended to the users; and
the parameter is a threshold distance according to which the first version of the recommender determines whether to provide a recommendation of a job to the user.

10. The method of any of descriptions 1-8, wherein:
the recommendations refer to social contacts recommended to the users;
the parameter is a threshold age according to which the first version of the recommender determines whether to provide a recommendation of a social contact to the user.

11. The method of any of descriptions 1-8, wherein:
the recommendations refer to romantic contacts recommended to the users;
the parameter is a threshold distance according to which the first version of the recommender determines whether to provide a recommendation of a romantic contact to the user.

12. The method of any of descriptions 1-8, wherein:
the recommendations refer to products recommended to the users; and
the parameter is a threshold price according to which the first version of the recommender determines whether to provide a recommendation of a product to the user.

13. The method of any of descriptions 1-12 wherein:
the tokenizing of the message includes tokenizing an email received from the user.

14. The method of any of descriptions 1-12, wherein:
the tokenizing of the message includes tokenizing a blog post published on behalf of the user.

15. The method of any of descriptions 1-12, wherein:
the identifying of the parameter identifies a unigram token among the tokens within the tokenized message as the parameter.

16. The method of any of descriptions 1-12, wherein:
the identifying of the parameter identifies a bigram token among the tokens within the tokenized message as the parameter.

17. A non-transitory machine-readable storage medium comprising instructions that, when executed by one or more processors of a machine, cause the machine to perform operations comprising:
presenting a first version of a recommender configured to provide users with recommendations based on a plurality of parameters that configure the first version of the recommender;
identifying a parameter among the plurality of parameters by tokenizing a message submitted by a user among the users and identifying the parameter among tokens within the tokenized message;
generating a second version of the recommender by modifying the parameter identified among the tokens and configuring the second version according to the modified parameter, the generating of the second version of the recommender being performed by the one or more processors of the machine; and
presenting the first version of the recommender contemporaneously with the second version of the recommender, the first version being presented to a first portion of the users, the second version being presented to a second portion of the users.

18. The non-transitory machine-readable storage medium of description 17, wherein the operations further comprise:
tokenizing a further message submitted by a further user among the second portion of the users; and
determining that the second version of the recommender is a replacement of the first version of the recommender based on the parameter being among tokens of the tokenized further message.

19. A system comprising:
a presentation module configured to present a first version of a recommender configured to provide users with recommendations based on a plurality of parameters that configure the first version of the recommender;
a feedback module configured to identify a parameter among the plurality of parameters by tokenizing a message submitted by a user among the users and identifying the parameter among tokens within the tokenized message;

a processor configured by a modification module to generate a second version of the recommender by modifying the parameter identified among the tokens and configuring the second version according to the modified parameter; and an evaluation module configured to present the first version of the recommender contemporaneously with the second version of the recommender, the first version being presented to a first portion of the users, the second version being presented to a second portion of the users.

20. The system of description 19, wherein:

the recommendations refer to jobs recommended to the users; and the parameter is a threshold distance according to which the first version of the recommender determines whether to provide a recommendation of a job to the user.

What is claimed is:

1. A method comprising:

by one or more processors of a machine, providing users with access to a recommendation engine configured based on a first set of parameters;

by one or more processors of the machine, tokenizing a message communicated by one of the users and detecting that a token in the message is a parameter among the first set of parameters;

by one or more processors of the machine, obtaining a second set of parameters from the first set of parameters by adjusting the parameter detected in the message; and by one or more processors of the machine, enabling a first group of the users to access the recommendation engine configured based on the first set of parameters and a second group of users to access the recommendation engine configured based on the second set of parameters.

2. The method of claim 1, wherein:

the message is a first message communicated by a first user among the users; and the method further comprises:

tokenizing a second message communicated by a second user among the first group enabled to access the recommendation engine configured based on the first set of parameters; and selecting the second set of parameters as a replacement for the first set of parameters to configure the recommendation engine, the selecting being based on the parameter identified from the first message being included among tokens of the second message communicated by the second user among the first group.

3. The method of claim 1, wherein:

the message is a first message communicated by a first user among the users; and the method further comprises:

tokenizing a second message communicated by a second user among the first group enabled to access the recommendation engine configured based on the first set of parameters; and determining that the second set of parameters is not a replacement for the first set of parameters to configure the recommendation engine, the determining being based on the parameter identified from the first message being included among tokens of the second message communicated by the second user among the first group.

4. The method of claim 1, wherein:

the message is a first message communicated by a first user among the users; and the method further comprises:

tokenizing a second message communicated by a second user among the second group enabled to access the recommendation engine configured based on the second set of parameters; and selecting the second set of parameters as a replacement for the first set of parameters to configure the recommendation engine, the selecting being based on the parameter identified from the first message being included among tokens of the second message communicated by the second user among the second group.

5. The method of claim 1, wherein:

the message is a first message communicated by a first user among the users; and the method further comprises:

tokenizing a second message communicated by a second user among the second group enabled to access the recommendation engine configured based on the second set of parameters; and determining that the second set of parameters is not a replacement for the first set of parameters to configure the recommendation engine, the determining being based on the parameter identified from the first message being included among tokens of the second message communicated by the second user among the second group.

6. The method of claim 1, wherein:

the detecting that the token in the message is the parameter among the first set of parameters includes determining a sentiment of the message that corresponds to the user; and the adjusting of the parameter detected in the message is based on the sentiment of the message being positive.

7. The method of claim 1, wherein:

the detecting that the token in the message is the parameter among the first set of parameters includes determining a sentiment of the message that corresponds to the user; and the adjusting of the parameter detected in the message is based on the sentiment of the message being negative.

8. The method of claim 1, wherein:

the recommendation engine is configured to recommend jobs; and the identified parameter is a threshold geographical distance on the basis of which the recommendation engine, when configured based on the first set of parameters, is configured to determine whether to provide a recommendation of a job to a user among the users.

9. The method of claim 1, wherein:

the recommendation engine is configured to recommend social contacts; and the identified parameter is a threshold age difference on the basis of which the recommendation engine, when configured based on the first set of parameters, is configured to determine whether to provide a recommendation of a social contact to a user among the users.

10. The method of claim 1, wherein:

the recommendation engine is configured to recommend social contacts; and the identified parameter is a threshold age on the basis of which the recommendation engine, when configured based on the first set of parameters, is configured to determine whether to provide a recommendation of a social contact to a user among the users.

11. The method of claim 1, wherein:

the recommendation engine is configured to recommend romantic contacts; and the identified parameter is a threshold geographical distance on the basis of which the recommendation engine, when configured based on the first set of parameters, is configured to determine whether to provide a recommendation of a romantic contact to a user among the users.

12. The method of claim 1, wherein:
the recommendation engine is configured to provide recommendations of products; and
the identified parameter is a threshold price on the basis of which the recommendation engine, when configured based on the first set of parameters, is configured to determine whether to provide a recommendation of a product to a user among the users.

13. The method of claim 1, wherein:
the tokenizing of the message communicated by the one of the users includes tokenizing an email received from the one of the users.

14. The method of claim 1, wherein:
the tokenizing of the message communicated by the one of the users includes tokenizing an online posting published on behalf of the one of the users.

15. The method of claim 1, wherein:
the detecting that the token in the message is the parameter among the first set of parameters includes detecting that a unigram token in the tokenized message matches the parameter.

16. The method of claim 1, wherein:
the detecting that the token in the message is the parameter among the first set of parameters includes detecting that a bigram token in the tokenized message matches the parameter.

17. A non-transitory machine-readable storage medium comprising instructions that, when executed by one or more processors of a machine, cause the machine to perform operations comprising:
by one or more processors of the machine, providing users with access to a recommendation engine configured based on a first set of parameters;
by one or more processors of the machine, tokenizing a message communicated by one of the users and detecting that a token in the message is a parameter among the first set of parameters;
by one or more processors of the machine, obtaining a second set of parameters from the first set of parameters by adjusting the parameter detected in the message; and
by one or more processors of the machine, enabling a first group of the users to access the recommendation engine configured based on the first set of parameters and a second group of users to access the recommendation engine configured based on the second set of parameters.

18. The non-transitory machine-readable storage medium of claim 17, wherein:
the message is a first message communicated by a first user among the users; and the operations further comprise:
tokenizing a second message communicated by a second user among the first group enabled to access the recommendation engine configured based on the first set of parameters; and
determining that the second set of parameters is not a replacement for the first set of parameters to configure the recommendation engine, the determining being based on the parameter identified from the first message being included among tokens of the second message communicated by the second user among the first group.

19. A system comprising:
processors; and
a memory storing instructions that, when executed by at least one processor among the processors, causes the system to perform operations comprising:
providing users with access to a recommendation engine configured based on a first set of parameters;
tokenizing a message communicated by one of the users and detecting that a token in the message is a parameter among the first set of parameters;
obtaining a second set of parameters from the first set of parameters by adjusting the parameter detected in the message; and
enabling a first group of the users to access the recommendation engine configured based on the first set of parameters and a second group of users to access the recommendation engine configured based on the second set of parameters.

20. The system of claim 19, wherein:
the message is a first message communicated by a first user among the users; and the operations further comprise:
tokenizing a second message communicated by a second user among the first group enabled to access the recommendation engine configured based on the first set of parameters; and
selecting the second set of parameters as a replacement for the first set of parameters to configure the recommendation engine, the selecting being based on the parameter identified from the first message being included among tokens of the second message communicated by the second user among the first group.

* * * * *